Figure 1:
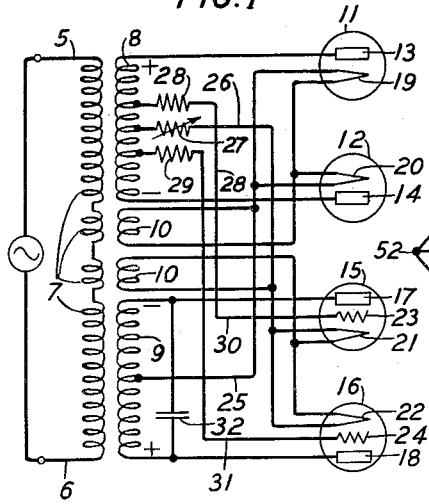

Oct. 24, 1933.  A. L. SAMUEL  1,931,877

TESTING SYSTEM FOR SPACE DISCHARGE DEVICES

Filed June 5, 1931

INVENTOR
A. L. SAMUEL
BY
*H. A. Burgess*
ATTORNEY

Patented Oct. 24, 1933

1,931,877

UNITED STATES PATENT OFFICE 1,931,877

TESTING SYSTEM FOR SPACE DISCHARGE DEVICES

Arthur L. Samuel, New York, N. Y., assignor to Bell Telephone Laboratories, Incorporated, New York, N. Y., a corporation of New York Application June 5, 1931. Serial No. 542,218

11 Claims. (Cl. 250—27)

This invention relates to space discharge devices and more especially to methods and means of life testing electric space discharge devices.

In testing space discharge devices, especially those of high power, if the energy dissipated is large the cost thereof becomes an important item.

Heretofore, certain types of electrical apparatus have been tested and the power which would otherwise be dissipated as heat has been returned to the power mains. This can be readily accomplished in testing transformers, motors, generators, etc., where in any case the load can be a generator which produces current of the type and voltage obtained from the power mains and with other necessary apparatus, power can be returned to the power lines.

In testing vacuum or gas or vapor-filled tubes with the power return or "pump-back" method considerable extra apparatus is usually required especially so since such tubes are inherently unidirectional and the power source is generally alternating current. A direct current motor and an alternating current generator have heretofore been used which together with phase adjusting apparatus require considerable attention and maintenance.

The present invention has as an object a method of testing multi-electrode gas or vapor-filled tubes in which the power dissipated is very small while the tubes are tested at their rated current and voltage.

Another object of the invention is a method of life testing tubes of the type mentioned which requires a minimum of attention and maintenance since no moving parts are involved.

Two general methods are proposed which are basically similar but which attain their results in slightly dissimilar fashion.

The first method is of the type known as the power return or "pump-back" method and consists of an arrangement by means of which the testing current induces back into the power lines energy of substantially the same value as that absorbed from the power lines, of which the test current is a part.

Specifically, in one form, which this invention may take, the transformer connecting the tubes to be tested to the power lines may have a single primary and two secondary windings. One secondary winding has its ends connected to the anodes of two 2-electrode devices, the cathodes of which are connected together and which may be heated in any convenient manner. The second secondary has its ends connected to the anode of a pair of 3-electrode tubes the cathodes of which are also connected together and may be heated in any convenient manner.

The mid-point of each secondary is connected to the cathodes of the devices associated with the other secondary. A control voltage for the grids of the 3-electrode devices may be obtained from a special low voltage winding or may be connected to low voltage points adjacent the mid-point of the secondary associated with the 2-electrode devices. With such connection at any given instant, current will flow through the halves of the secondaries in such a direction that the power transferred to one half from the primary will be returned thereto with only a slight decrease from the corresponding half of the other secondary. The low voltage connections to the grids impress on the grids alternate, positive and negative potentials causing alternate action of the devices as the power current alternates.

In the second method proposed the amount of power dissipated is kept small as compared to the rated power of the tubes under test, by using test current at low voltage and the high test voltage with substantially no current. The 2-electrode and 3-electrode devices are arranged in bridge form, that is, the 2-electrode devices are in opposite arms and the 3-electrode devices are in the remaining arms. Across one diagonal of the bridge, the high voltage is impressed while in the second diagonal the low voltage current is introduced in series with resistance which dissipates the small amount of energy required. The grids of the 3-electrode devices are connected to opposite ends of the low voltage winding to control the passage of current through the devices.

Figure 2:
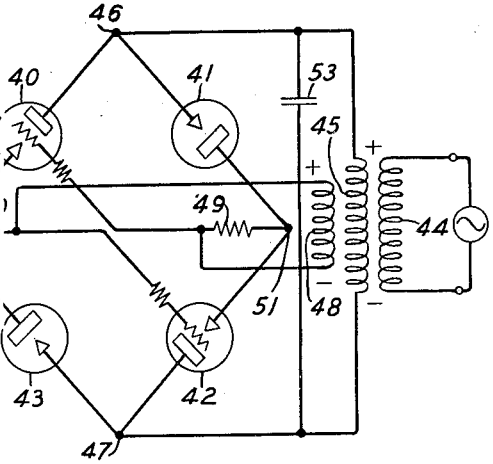
Figure 3:
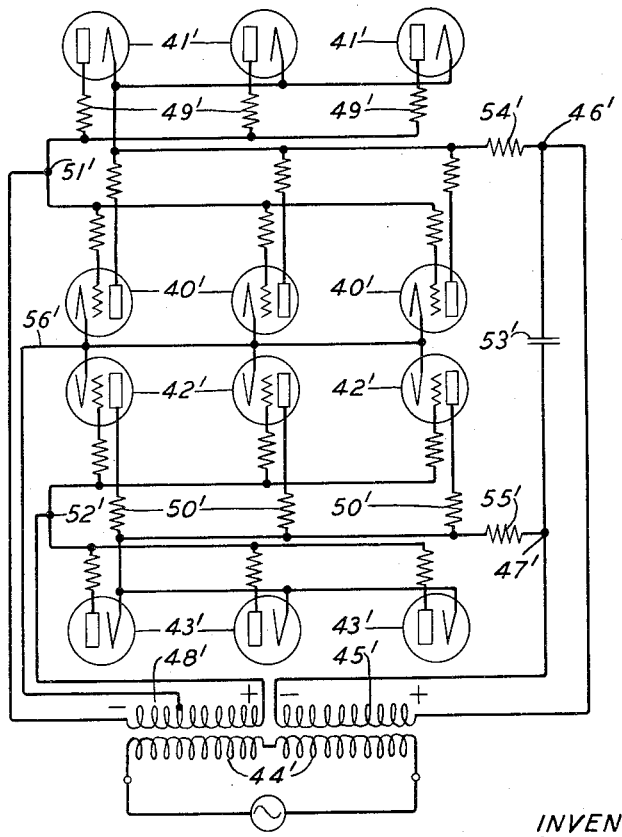

Other features of the invention will be apparent and the invention will be better understood from the following description and the attached drawing, forming a part thereof, in which Fig. 1 illustrates schematically a form of "pump-back" testing. Fig. 2 illustrates schematically a form of the second method and Fig. 3 shows the circuit for a practical installation for the second method. In all three figures the tubes are assumed to be of the hot-cathode gas-filled type.

Referring now particularly to Fig. 1 the power is introduced from the usual commercial power lines through leads 5 and 6 and a transformer having a primary winding 7 and secondary windings 8 and 9. The relation of windings 8 and 9 is such that the voltage induced in winding 8 is slightly higher than that induced in winding 9 and is of opposite polarity. Windings 10 serve only to heat the cathodes of the tubes under test and need not be further considered.

The ends of transformer winding 8 are connected to anodes 13 and 14 of the 2-electrode tubes 11 and 12 respectively and the ends of winding 9 are connected to the anodes 17 and 18 of the 3-electrode tubes 15 and 16 respectively.

The mid-point of winding 8 is connected by lead 26, which includes a variable resistance 27, to cathodes 21 and 22 of tubes 15 and 16. Also the mid-point of winding 9 is connected by lead 25 to cathodes 19 and 20 of tubes 11 and 12. Grids 23 and 24 of tubes 15 and 16 are connected by leads 30 and 31, which includes resistances 28 and 29 respectively, to points in winding 8 adjacent the mid-point to impress a potential on the grids of a value and for a purpose which will appear hereinafter. A condenser 32 is connected across winding 9.

Assume for the purposes of description that at a particular instant the voltage across the upper half of winding 8 is a maximum with the upper terminal positive. At the same time, since winding 9 is wound opposite to that of winding 8 and of slightly less turns, the voltage of the upper terminal of winding 9 will be negative at a slightly less value numerically than the upper terminal of winding 8. For the present the action of condenser 32 is disregarded.

Under the assumed conditions current will flow through tube 11 to the mid-point of winding 9, the upper half of this winding to anode 17 of tube 15 through the tube, lead 26, resistance 27 and upper half of winding 8. It will be noted that anode 17 of tube 15, while connected to the negative end of winding 9, is at a positive potential with respect to its cathode and that grid 23 is positive so that tube 15 is in a conducting condition. Also anode 18 of tube 16 is positive but its grid 24 is negative and hence no current will flow through tube 16.

The voltage acting on this closed circuit will be the difference between that at the upper terminal of winding 8 and that due to induction from primary winding 7 at the upper terminal of winding 9. This voltage must equal the drop through tubes 11 and 15 and resistance 27. For example, if the voltage at the mid-point of winding 8 is zero, that at the upper terminal is 10,000 volts, that at the upper terminal of winding 9 is 8,980 volts, the drop through each tube is 10 volts and resistance 27 is 1,000 ohms the current flow through the circuit will be:

$$\frac{10{,}000 - 8{,}980 - 20}{1{,}000} = 1 \text{ ampere.}$$

With the numerical values given it will be seen that there is an inverse voltage of approximately 20,000 volts across the terminals of tube 12 and a direct voltage of approximately 18,000 volts across the terminals of tube 16. However, as previously noted the grid of tube 16 is negative so that no current will flow therethrough.

As the induced voltages in the secondary decrease sinusoidally the voltage differences and the current will also decrease sinusoidally until a quarter of a cycle later the induced voltages pass through zero and start to build up in the opposite direction.

In order that tube 15 be rendered non-conducting the potential on its grid must increase at a rate proportionally larger than the rate at which the anode potential increases and the anode potential must remain below some low value for a certain period of time or go negative for a short time to permit the tube to become completely de-ionized. The first condition can be met by making the value of the impressed grid potential from the transformer a sufficiently large value. The second condition may be met by causing the impressed voltage in the upper half of winding 9 to lag behind the voltage in the upper half of winding 8 by some definite amount. This is done in the present case by connecting condenser 32 across the terminals of the winding 9. The leading current drawn by this capacity flowing through the leakage reactance of the transformer will cause this terminal voltage to lag in phase with the induced voltage, which in phase with the induced voltage in winding 8.

Consider the condition when the voltage in the upper half of winding 8 is passing through zero and assume that the voltage in the upper half of winding 9 is still negative by some small amount. It should be noted as previously mentioned that the drop through the tubes is about 10 volts.

When the potential of anode 18 is approximately 100 volts positive as compared to cathode 22 and is becoming less positive the lower plate of condenser 32 is at the same potential or approximately 100 volts positive. Anode 17 of tube 15 is 10 volts more positive than its cathode (drop through tube) since current still flows through this tube. At about this instant grid 24 of tube 16 becomes positive and current starts to flow through this tube. The potential of anode 18 will therefore suddenly drop from 100 volts to 10 volts more positive than cathode 22 due to its tube drop. As anode 18 drops in potential the lower plate of condenser 32 must also drop and the upper plate of condenser 32 must drop an equal amount. Since anode 17 was only 10 volts more positive than cathode 21, which is at the same potential as cathode 22, the sudden falling of the potential of the upper plate of condenser 32 by approximately 90 volts will carry the potential of anode 17 to a potential more negative than the cathode 22. This condition will hold until the voltage induced in winding 9 causes anode 17 and upper plate of condenser 32 to go positive. This interval is long enough to de-ionize tube 15 and as grid 23 will now have become negative relative to cathode 21 no current will flow through tube 15.

It is to be understood that any or all of the tubes 11, 12, 15 and 16 may be under test, the only requirement being that they all have the same rating as to anode potential and current carrying capacity. Also it will readily be seen that for one half cycle tubes 11 and 15 pass rated maximum current while tubes 12 and 16 have inversely impressed upon them rated maximum voltage and that on the succeeding half cycle the opposite condition will hold.

Taking the numerical values for voltages, etc., assumed earlier, which values correspond substantially with those required for certain tubes, it will be seen that there is transferred to winding 8 at peak voltage 10,000 volts at a load of one ampere or 10 kw. Most of this power is returned to winding 7 by the upper half of winding 9 through which one ampere flows with a drop of substantially 8,980 volts. There is, therefore, transferred back to winding 7 approximately 9 kw. The system, therefore, dissipates approximately 10% of the power required for testing tubes at rated voltage and current.

Also the phase of the voltages and currents are such as to permit the return of power since there is a slight lag of current in winding 8 referred to that in winding 7 and this lag is compensated for by the lead introduced by condenser 32.

The second method of life testing tubes is illustrated in its simplest form in Fig. 2. Tubes 40, 41, 42 and 43 are arranged in bridge form. Primary winding 44 of a multi-winding transformer is connected to the ordinary commercial power mains. The terminals of high voltage winding 45 are connected to points 46 and 47 of the bridge arrangement while the terminals of low voltage winding 48 are connected through resistances 49 and 50 to points 51 and 52 of the bridge. Leads from the terminals of winding 48 are connected to the grids of tubes 40 and 42 so that the grid of tube 40 has impressed upon it the potential of one end of winding 48, while the grid of tube 42 has impressed upon it the potential of the other end of the winding. A condenser 53 is connected across the high voltage winding 45.

The principle of this arrangement will be best understood by tracing the paths of the current from the low voltage source on one half the cycle and observing the simultaneous application of the high voltage to the tubes. With the polarity of the windings as indicated on the drawing, that is, the upper terminals of both windings 45 and 48 being positive, tubes 43 and 42 are passing normal load current, the voltage being supplied by the low voltage winding 48 and the current limited by the series resistances 49 and 50. The negative terminal of the high voltage winding differs in potential from that of the positive terminal of the low voltage winding 48 by the drop through resistance 50 and the drop through tube 43. The potential of the cathode of tube 40 differs from that of the negative terminal of the high voltage winding 45 only by the drop through tube 43 and its anode is at the potential of the positive terminal of the high voltage winding. Tube 40 would, therefore, conduct except that its grid is negative, since it is connected to the negative terminal of the low voltage winding. Tube 41 has the full high voltage of winding 45 plus the drop through tube 42 applied across its terminals in the inverse direction. It is, of course, understood that on the succeeding half cycle the conditions are exactly reversed.

It is to be noted that as in the case of the arrangement of Fig. 1, the high voltage should lag the low voltage a slight amount, that is, the anode of tube 42, for example, at the end of its conducting half cycle should go to zero or slightly negative for a sufficient interval to permit the grid to go negative and to allow the ions to be removed from the space within the tube. If this does not occur the tube will remain conducting during the half cycle when it should be non-conducting. Also, this lag in high voltage means that unless the proper adjustment is made the grid bias of tube 40 will be removed before the anode voltage has been reduced to zero on its non-conducting half cycle so that the high voltage will be momentarily short-circuited through tubes 40 and 43. This is avoided and the proper phase relationship established by condenser 53 connected across the high voltage winding. The proper adjustment causes the grid bias to pass through zero at that time when the voltage of the high voltage winding is equal to the normal tube drop and is decreasing. Condenser 53 draws a leading current through a portion of the series resistances and through the leakage reactance of the transformer to produce the desired lag in the phase of the high voltage.

As is readily apparent the number of tubes which may be tested at the same time may be increased by connecting the additional tubes in parallel to those illustrated. For example, in Fig. 1 it is apparent that 2-electrode tubes may be added in parallel with tubes 11 and 12 and that 3-electrode tubes may be added in parallel with tubes 15 and 16.

In the same way parallel tubes may be added to the arrangement of Fig. 2. A practical arrangement which has proven very efficient is shown schematically in Fig. 3, where six 2-electrode and six 3-electrode tubes are shown. This arrangement has been utilized in testing twelve tubes of each type at the same time so that the number of tubes to be tested is limited only by practical considerations, such as space, etc.

In Fig. 3 the reference numerals used in Fig. 2 have been used with primes to make more apparent the similarity to Fig. 2. The primary winding 44' of the transformer is shown as in inductive relation with high voltage winding 45' and low voltage load current winding 48'. Condenser 53' is connected across the high voltage winding in the same manner and for the same purpose as condenser 53 of Fig. 2. It will also be seen that with the polarity of the windings as indicated in Fig. 3 current flows through tubes 43' and then through tubes 42' from winding 48'. Also the negative potential of the high voltage windings assumes the potential of the positive terminal of the low voltage winding less the drop through resistances 50' and tubes 43'. The grids of the tubes 42' are positive, while those of tubes 40' are negative. The anodes of tubes 41' are negative as related to their cathodes and with the grids of tubes 40' also negative no current can flow through these tubes as pointed out in connection with Fig. 2.

The mid-point of low voltage winding 48' is connected to the cathodes of the 3-electrode tubes 40' and 42' by lead 56'. This lead may also be connected to ground whereby all the cathodes of the 3-electrode tubes are at the same ground potential which, of course, is advantageous from a practical standpoint. This, in effect, causes winding 48' to be a two-winding secondary instead of a single winding secondary as in Fig. 2. The operation of the system, however, is in no way affected as far as the alternate action of the groups of parallel connected 2-electrode and 3-electrode tubes. Resistances 54' and 55' in the leads from high voltage winding 45' to the anodes of tubes 40' and 42' are inserted merely for protective purposes and serve no purpose in the normal operation of a circuit since no current flows from winding 45'.

It is obvious from the description just given of Figs. 2 and 3 that the only power dissipated is that due to the maximum tube load current at a low voltage passing through the tubes and resistances 50' or 49' on alternating half cycles. Also, that where as maximum tube voltage is applied to the tubes no current flows at this high voltage and hence no power is used. The tubes, therefore, are life-tested at their normal maximum current and voltage, but with dissipation of power much less than the normal maximum power rating of the tubes.

The invention, as herein disclosed, is not to be limited to the specific disclosure but only within the scope of the appended claims.

What is claimed is:

1. The method of testing space discharge devices which comprises passing through certain of said devices, a current and impressing on certain others of said devices a voltage from the same primary alternating current source during a half cycle of said source and similarly passing a current through and impressing a voltage on the others of said device during the second half cycle of said source.

2. The method according to claim 1 which comprises supplying, alternately, to the devices under test the maximum rated values of current and voltage of said devices.

3. The method of testing space discharge devices in pairs comprising, supplying, from a unitary primary source, the maximum rated current and maximum rated voltage to one device of each of said pairs during a half cycle of said primary source, and similarly supplying the maximum rated current and voltage to the other of said pairs of devices during the second half cycle of said source.

4. In a system for testing space discharge devices, a multi-winding transformer, connections between one of said windings and an alternating current power source, space discharge devices to be tested, arranged in sets of pairs, leads connecting the ends of the second of said transformer windings with the anodes of one set of pairs of devices, leads connecting the ends of the third of said transformer windings with the anodes of the other set of said pairs of devices, leads connecting the mid-points of the second and third windings to the cathodes of the dissociated sets of pairs of devices, respectively, leads connecting points on either side of, but adjacent to the mid-point of said second winding to the control electrodes of said set of pairs of devices the anodes of which are connected to said third winding, and a condenser connected across said third winding.

5. In a system for testing space discharge devices, a plurality of said devices arranged in sets of pairs, means for applying to the anodes of one group of each of said sets of pairs of devices, a positive potential and to the anodes of the other group, a negative potential, means for impressing on the cathodes of each of said sets of pairs, a potential substantially intermediate that applied to the anodes of the other of said sets of pairs, and means for impressing upon the control electrodes of one of said sets of pairs potentials slightly more positive and more negative, respectively, than the potential of their cathodes.

6. In a system for testing space discharge devices, a plurality of said devices arranged in sets of pairs, means for applying to the anodes of certain of said devices a positive potential, means for applying to the anodes of certain others of said devices a potential of relatively lower value than said first mentioned potential, and means associated with certain of said devices to prevent current flow through said devices due to said higher positive potential.

7. In a system for testing space discharge devices, a plurality of said devices, means for applying to the anodes of certain of said devices, a positive potential from one source, means for applying to the anodes of certain others of said devices a positive potential of relatively lower value from a second source, and means to prevent a flow of current from said high potential source.

8. In a system for testing space discharge devices, a plurality of said devices arranged in bridge form, devices of one type arranged in opposite arms of said bridge, devices of the second type arranged in the other arms of said bridge, a low voltage source applied to one diagonal of said bridge and a high voltage source applied to the other diagonal of said bridge.

9. In a system for testing space discharge devices, a plurality of said devices, a multi-winding transformer, connections from one of said windings to a source of alternating current power, a second winding in which there is induced a high voltage from said first winding, a third winding in which there is induced a relatively lower voltage than that induced in said second winding, connections from the ends of said low voltage winding to the anodes of certain of said devices, connections from the ends of said high voltage winding to the anodes of said others of said devices, means which prevent flow of current from said high voltage winding, and means which permit flow of current from said low voltage winding.

10. In a system for testing space discharge devices, a plurality of said devices, an alternating current power source, means for supplying to a first group of said devices rated maximum voltage and to a second group of said devices rated maximum current during a half cycle of said power source, means to supply to said first group maximum rated current and to said second group maximum rated voltage during the other half cycle of said power source.

11. In combination, a plurality of space discharge devices, an alternating current power source, a multi-winding transformer, one winding of which is connected to said power source, a second winding having induced therein a high voltage, a third winding having induced therein a relatively low voltage, a group of one type of said devices arranged in parallel in one arm of a bridge, a second group of the same type of devices arranged in parallel in the opposite arm of said bridge, a group of a second type of said devices arranged in parallel in a third arm of said bridge, a second group of said second type of devices arranged in parallel in the fourth arm of said bridge, connections between the ends of said high voltage winding and one diagonal of said bridge, leads including resistances connecting the ends of said low voltage winding to the other diagonal of said bridge, and connections from points on the low voltage diagonal to the control electrodes of each of said groups of one type of said devices whereby maximum rated current of said devices at low voltage flows through certain of said groups of devices and maximum rated voltage of said devices but no current is impressed on the others of said devices alternately during each half cycle of said power source.

ARTHUR L. SAMUEL.